United States Patent

Meltzer et al.

[11] Patent Number: 5,364,913
[45] Date of Patent: Nov. 15, 1994

[54] THERMOSET COMPOSITIONS BASED ON NYLON-1

[75] Inventors: Aaron D. Meltzer, Carnegie; Douglas A. Wicks, Mt. Lebanon; Harald Pielartzik, Pittsburgh, all of Pa.

[73] Assignee: Miles Inc., Pittsburgh, Pa.

[21] Appl. No.: 98,531

[22] Filed: Jul. 28, 1993

Related U.S. Application Data

[63] Continuation-in-part of Ser. No. 970,670, Nov. 3, 1992, abandoned.

[51] Int. Cl.$^5$ ............... C08F 283/04; C08L 67/00
[52] U.S. Cl. ................... 525/440; 525/419; 525/420; 525/424
[58] Field of Search ............ 525/440, 419, 420, 424

[56] References Cited

U.S. PATENT DOCUMENTS

| | | | |
|---|---|---|---|
| 2,965,614 | 12/1960 | Shashoua | 260/77.5 |
| 3,225,119 | 12/1965 | Baker, Jr. | 260/874 |
| 3,300,432 | 1/1967 | Tarricone et al. | 260/29.6 |
| 3,367,900 | 2/1968 | Horst | 260/31.8 |
| 3,396,150 | 8/1968 | Dickson et al. | 260/77.5 |
| 3,681,473 | 8/1972 | Chow et al. | 260/857 TW |
| 4,111,914 | 9/1978 | Kresta et al. | 528/48 |
| 4,224,431 | 9/1980 | Heiss | 528/48 |
| 4,250,106 | 2/1981 | Heiss | 260/453 SP |

*Primary Examiner*—James J. Seidleck
*Assistant Examiner*—Mary Critharis
*Attorney, Agent, or Firm*—Joseph C. Gil; Aron Preis

[57] ABSTRACT

A thermosetting composition is prepared by reacting a highly crosslinked nylon-1 which contains structural units corresponding to

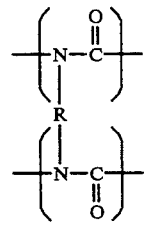

where R is an organic radical with a isocyanate-reactive compound. In carrying out the reaction the molar ratio of carbonyl groups to NCO-reactive groups is about 0.5:1 to 20:1. Desirable properties characterize the reaction product thus prepared.

9 Claims, No Drawings

THERMOSET COMPOSITIONS BASED ON NYLON-1

CROSS-REFERENCE TO RELATED APPLICATION

This application is a continuation-in-part of U.S. Ser. No. 07/970,670, filed on Nov. 3, 1992, now abandoned.

FIELD OF THE INVENTION

The invention relates to a thermoset composition and more particularly to a composition based on a highly cross-linked nylon-1.

SUMMARY OF THE INVENTION

A thermosetting composition is prepared by reacting a highly crosslinked nylon-1 which contains structural units corresponding to

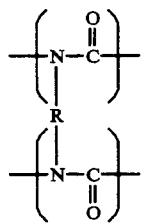

where R is an organic radical with a isocyanate-reactive compound. In carrying out the reaction the molar ratio of carbonyl groups to NCO-reactive groups is about 0.5:1 to 20:1. Desirable properties characterize the reaction product thus prepared.

BACKGROUND OF THE INVENTION

The preparation of high molecular weight linear polymers of organic isocyanates has been disclosed in U.S. Pat. No. 2,965,614. Accordingly, organic isocyanate is treated under anhydrous conditions with an alkali metal anionic catalyst at a temperature below 20° C., is an appropriate solvent. The preparation of a thermoplastic copolymer of isocyanate monomers with vinyl monomers has been disclosed in U.S. Pat. No. 3,225,119. Methods for catalyzing the polymerization of methylisocyanate monomer have been disclosed in U.S. Pat. Nos. 3,300,432, 3,396,150 and 3,367,900. Certain N-substituted nylon-1 compounds were disclosed in U.S. Pat. No. 3,681,473 to have utility as polymerization initiators in the ionic polymerization of lactam monomer.

A catalytic polymerization reaction of isocyanate to form nylon-1 has been disclosed in "Living Coordination Polymerizations of Isocyanates" by Timothy E. Patten and Bruce M. Novak, Polymer Preprints 32 (2), 1991, p. 625. The reaction is described as

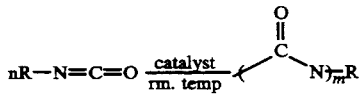

the catalyst used in the reaction was trifluoroethoxy titanium trichloride.

The preparation of coatings by reacting a blocked isocyanate with a polyol is well known in the art. A large variety of coatings based on this technology has been disclosed in the patent literature. Linear, heterocyclic nylon-1 polymers have been disclosed in U.S. Pat. Nos. 4,224,431 and 4,250,106. The use of the linear system as a blocked diisocyanate for the production of polyurethane useful as binder for paints and coatings has thus been disclosed.

DETAILED DESCRIPTION OF THE INVENTION

Thermosetting, isocyanate-based reaction products, including coatings and potting compounds, are prepared by reacting, preferably at a temperature in the range of 200° to 500° F.

(i) a highly crosslinked nylon-1 having a low residual isocyanate functionality with (ii) a suitable isocyanate-reactive compound.

In carrying out the reaction, the molar ratio of carbonyl groups to NCO-reactive groups is about 0.5:1 to 20:1. For the purpose of determining the molar ratio isocyanates are to be included in the term carbonyl groups. Desirable properties characterize the reaction product thus prepared.

The process for the preparation is conventional and the product, offers definite improvements over prior art thermosetting compositions. Since nylon-1 contains no blocking agents, there are no residues of these agents in the reaction product. This is believed to contribute to the improved properties of the products prepared in accordance with the invention.

The crosslinked nylon-1 polymer which is preferably formed by the anionic or coordination polymerization of polyfunctional isocyanate monomers in that it contains structural units conforming to

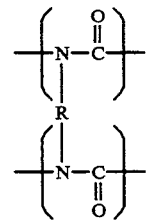

where R is an organic radical may be formed by the anionic or coordination polymerization of polyfunctional isocyanate monomers or adducts. In the above structure, R denotes a linear hydrocarbon group, more preferably a divalent hydrocarbon group, having 4 to 25 carbon atoms, a divalent cycloaliphatic hydrocarbon group having 5 to 15 carbon atoms, a divalent araliphatic hydrocarbon having 7 to 15 carbon atoms or a divalent aromatic hydrocarbon group having 6 to 15 carbon atoms. R may contain additional functional groups such as uretdione biuret or allophanate.

The highly cross-linked nylon-1 polymer entailed in the present invention is insoluble in any conventional solvent. It is preferably cross linked to the extent such that at least 50 mole-percent of the monomers from which the nylon-1 is prepared are chemically attached to two distinct polymer backbones.

In carrying out the reaction in the presence of a titanium(IV) trichloride catalyst, it is preferred to use a solvent system which consists of a mixture of aliphatic and aromatic hydrocarbons. The preferred system of solvents contains a mixture of 1:1 to 1:20 (aliphatic-:aromatic, volume ratio) hydrocarbon solvents. Most preferably, the system contains hexane and xylene in a volume ratio of 1:3 therebetween.

The compound suitable for a reaction with nylon-1, in accordance with the invention, is an organic compound containing an isocyanate-reactive functional group, preferably at least two or more functional groups, which reacts with isocyanate upon heating to a temperature at which the nylon-1 depolymerizes to an isocyanate-containing compound. These isocyanate-reactive compounds may be used in their polymeric or monomeric forms. Examples of such functional groups include aliphatic hydroxy, phenols, as well as aliphatic and aromatic amines (primary and secondary), carboxylic anhydrides, carboxylic acids, ketimines and dienes. The polymeric forms are characterized in that their molecular weight is up to about 8000, preferably about 300 to 5000. Preferably, the reactants have two or more isocyanate-reactive groups. Examples of the high molecular weight compounds are hydroxyl-terminated polyesters, polycarbonates, polyestercarbonates, polyethers, polyethercarbonates, polyacetals, polyamides, polyureas, polyurethanes, polyolefins, polyamines, polyacrylates, polybutadienes, polyesteramides, and polythioethers. Amino-functional polyethers, such as those described in U.S. Pat. No. 4,724,252 and German Offenlegungsschrift 3,713,858, as well as polyethers prepared by the amination of polyether polyols, such as the commercially available products sold under the registered trademark "Jeffamine", may also be used. The polyesters, polycarbonates and polyethers are preferred. The most suitable isocyanate-reactive compound in the context of the invention is a polyol.

Suitable polyester polyols having a functionality of two or more, include reaction products of dihydric or polyhydric alcohols and dibasic or polybasic carboxylic acids or their anhydrides. Instead of free dicarboxylic acids, the corresponding anhydrides or diesters of lower alcohols, or mixtures thereof, may be used for preparing the polyester. The carboxylic acids may be aliphatic, cycloaliphatic, aromatic and/or heterocyclic, and they may be substituted, for example, by halogen atoms, and/or unsaturated. The following are mentioned as examples: succinic acid, adipic acid, suberic acid, azelaic acid, sebacic acid, phthalic acid, isophthalic acid, terephthalic acid, trimellitic acid, phthalic anhydride, tetrahydrophthalic anhydride, hexahydrophthalic anhydride, tetrahydroisophthalic anhydride, hexahydroisophthalic anhydride, endomethylene tetrahydrophthalic anhydride, glutaric anhydride, maleic anhydride, maleic acid, fumaric acid, dimeric fatty acids such as oleic acid, and dimethyl terephthalate and mixed terephthalates. Suitable dihydric alcohols include ethylene glycol; 1,3- and 1,2-propylene glycol; 1,4-, 1,3- and 2,3-butylene glycol; 1,6-hexamethylene glycol; 1,8-octanediol; neopentyl glycol; cyclohexanedimethanol or 1,4-bis-(hydroxymethyl)-cyclohexane; 2-methyl-1,3-propanediol; 2,2,4-trimethyl-1,3-pentanediol; diethylene glycol; dipropylene glycol; triethylene glycol; tripropylene glycol; dibutylene glycol; polyethylene glycol; polypropylene glycol; and polybutylene glycol. Suitable polyhydric alcohols include trimethylol propane, sucrose, manose, galactose and others. The polyesters may also contain a portion of carboxyl end groups. Polyesters of lactones, for example ε-caprolactone or hydroxycarboxylic acids, for example ω-hydroxycaproic acid, may also be used. Polycarbonates containing hydroxy groups include the products obtained from the reaction of diols; such as, 1,3-propanediol, 1,4-butanediol, 1,6-hexanediol, diethylene glycol, polyethylene glycol, polypropylene glycol and/or polytetramethylene glycol with phosgene, diaryl carbonates such as diphenylcarbonate or cyclic carbonates such as propylenecarbonate.

Suitable polyether polyols are obtained in known manner by the reaction of starting compounds which contain reactive hydrogen atoms with alkylene oxide such as ethylene oxide, propylene oxide, butylene oxide, styrene oxide, tetrahydrofuran, epichlorohydrin or with mixtures of these alkylene oxides.

Suitable starting compounds containing reactive hydrogen atoms include water, bisphenol A and the dihydric alcohols set forth for preparing the polyester polyols. Other compounds containing isocyanate reactive components suitable in the present context include the dihydric alcohols which have been described for the preparation of the polyester polyols; aminoalcohols such as N-methyl diethanolamine and aminoethanol; and diamines such as diaminoethane, 1,6-diaminohexane, piperazine, N,N'-bis(2-amino-ethyl) piperazine, 1-amino-3-aminomethyl-3, 5,5-trimethyl-cyclohexane (isophorone diamine or IPDA), bis(4-aminocyclohexyl) methane, bis(4-amino-3methylcyclohexyl) methane, 1,3- and 1,4-diaminocyclohexane and 1,3-diaminopropane. Hydrazine, amino acid hydrazides, hydrazides of semi-carbazidocarboxylic acids, bis-(hydrazides) and bis-(semicarbazides) and the like may also be used.

In the preparation of a composition in accordance with the invention, a nylon-1 and an isocyanate-reactive compound are reacted such that the molar ratio of carbonyl groups to NCO-reactive groups is about 0.5:1 to 20:1, preferably 0.8:1 to 5:1.

The invention is further illustrated but is not intended to be limited by the following examples in which all parts and percentages are by weight, unless otherwise specified.

EXAMPLES

Example 1

Preparation of a catalyst.

Trifluoroethanol (82.6 gram (gm), 0.83 mole) was placed in a 250 mL 3-neck flask fitted with a condenser, a dripping funnel and an HCl trap. The reaction vessel was flushed with $N_2$ (g) and 100 mL of dry toluene were cannulated into the vessel. $TiCl_4$ (93.0 mL, 0.85 mole) was cannulated into the dripping funnel. The $TiCl_4$ was slowly added to the flask so as to control the evolution of HCl (g), and the reaction mixture turned orange. When the evolution of gas subsided, the reaction mixture was heated to 80° C. causing the reaction mixture to turn dark red and after the further evolution of HCl gas subsided, the reaction was allowed to cool to room temperature and stored under $N_2$ (g).

Example 2

Preparation of nylon-1 based on linear aliphatic diisocyanate.

Hexamethylenediisocyanate, HDI,(200 gm) was placed in a 2L 3-neck reaction kettle fitted with a mechanical stirrer. The reaction vessel was flushed with $N_2$ (g) and 1.0 L of dry hexane was cannulated into the vessel. While stirring vigorously, 200 mL of the catalytic solution, which was prepared in A above, were slowly added with the aid of a syringe and syringe pump, and a yellow precipitate formed. Once the addition of the catalyst has been completed, the resulting nylon-1 was filtered off and allowed to dry. IR was used to confirm the presence of amide bonds (1700 cm$^{-1}$)

and to monitor residual isocyanate content (2275 cm$^{-1}$).

Example 3

Preparation of nylon-1 based on aromatic diisocyanate.

Methyldiphenyldiisocyanate, MDI, (10 gm) was dissolved in 50 mL of CH$_2$Cl$_2$ in a 100 mL round bottom flask. Once flushed with N$_2$ (g), 1.2 mL of the catalyst solution prepared in A were added. The reaction was stirred until a gel formed. The gel was titrated with hexane and filtered. The presence of an amide peak in the IR spectrum of the resulting product confirmed the formation of nylon-1.

Example 4

Preparation of nylon-1 containing on cyclic aliphatic diisocyanate.

Isophoronediisocyanate, IPDI, (20 gm) was placed in a 250 mL flask along with 25 mL hexane and 75 mL xylene. The reaction vessel was flushed with N$_2$ (g) and 0.8 mL of the catalyst solution prepared in A were added. Upon the addition of HDI (20 gm) to the reaction vessel, the mixture slowly gelled. The solvent was extracted from the gel with petroleum ether, yielding a powder which was then filtered. IR was used to confirm the presence of amide bonds and CP-MAS $^{13}$C-NMR confirmed that both comonomers polymerized.

Example 5

Preparation of a coating.

HDI-based nylon-1, 0.95 g, prepared in accordance with Example 2 above, was finely ground and swollen with 5.0 mL of dimethylformamide, (DMF) and 5.0 g of a polyester polyol was dissolved in the suspension. The polyester polyol, Desmophen 670-100, a product of Miles Inc., is a condensation product of isophthalic acid, terephthalic acid and trimethylol propane and is characterized in that it has a hydroxyl number of 139, an acid number of 2 and an equivalent weight of 400. The average functionality of this polyester polyol is 3.1. The DMF was evaporated under reduced pressure, and the mixture was heated to 150° C. for 1 hour. The resulting material was transparent and elastomeric in nature, sticking to the glass vessel in which it was formed.

Example 6 a. Preparation of Nylon-1:

HDI, 500 g, was dissolved in a mixed solvent system prepared from 1625 mL of xylene and 875 mL of hexane (% NCO ca. 10%). The system was placed under N$_2$ and 120 mL of the catalytic solution described in Example 1 was added over a period of about 8 hours with constant mixing. The residual % NCO was determined to be 1.76%. The reaction mixture was allowed to settle and the supernatant was decanted off, leaving swollen gelatinous particles that were determined to be 50% solids.

b. Preparation of Nylon-1:

HDI, 100 g, was dissolved in a mixed solvent system prepared from 375 mL of xylene and 125 mL of hexane (% NCO ca. 10%). The system was placed under N$_2$ and 24 mL of the catalytic solution described in Example 1 was added over a period of about 6 hours with constant mixing. The residual % NCO was determined to be 2.2%. The reaction mixture was allowed to settle and the supernatant was decanted off, leaving swollen gelatinous particles that were determined to be 50% solids.

Example 7 a. Preparation of a Coating:

The swollen nylon described in 6a. (210 g) was mixed with 200 g of system-A, consisting of an 80% solution in butylacetate of the condensation product of adipic acid, isophthalic acid, phthalic anhydride, hexane diol and trimethylolpropane, having an OH number of 112, acid number of 1.6 and an equivalent weight of 500. The mixture was ground up on an attritor (at 620 rpm using ¼" ball bearings) for 6 hours, drawn down to 210 microns and baked at 300° F. for 2 hours, producing a smooth, clear and colorless coating.

b. Preparation of a Film:

The swollen nylon described in 6b. (217 g) was mixed with 180 g of system-A and 20 g of system-B, which consists of an unsaturated polyester supplied at 65% solids in propylene glycol monomethyl ether acetate and xylene (6:1) having an equivalent weight of 330 and an OH number of 170. The polyester is formed via the condensation of adipic acid, hexahydrophthalic anhydride, phthalic anhydride and trimethylolpropane. The mixture was ground up on an attritor (at 620 rpm using ¼" ball bearings) for 6 hours, drawn down to 210 microns and baked at 300° F. for 2 hours, producing a free standing film.

c. Preparation of a Coating:

The swollen nylon described in 6a. (186 g) was mixed with 200 g of system-C having an equivalent weight of 607 and an OH number of 92 and which consists of a mixture of an acrylate prepared from butyl acrylate, styrene, hydroxymethyl methacrylate and acrylic acid, and a polyester similar to that described above in 7a., dissolved in butyl acetate/xylene (3:1) so as to be 65% solids. The mixture was ground up on an attritor (at 620 rpm using ¼" ball bearings) for 3 hours, drawn down to 210 microns and baked at 300° F. for 2 hours, producing a smooth, matt coating.

Although the invention has been described in detail in the foregoing for the purpose of illustration, it is to be understood that such detail is solely for that purpose and that variations can be made therein by those skilled in the art without departing from the spirit and scope of the invention, except as it may be limited by the claims.

What is claimed is:

1. A thermosetting composition prepared by reacting
  (i) a crosslinked nylon-1 which contains structural units conforming to

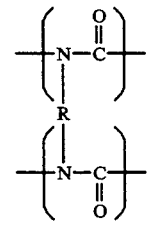

where R is an organic radical, with
  (ii) an isocyanate-reactive compound, wherein molar ratio of carbonyl groups to isocyanate-reactive groups is about 0.5:1 to 20:1 wherein said nylon-1 is crosslinked to the extent that at least 50 mole-percent of the monomers from which it has been prepared are chemically attached to two distinct polymer backbones.

2. The composition of claim 1 wherein R denotes a divalent linear hydrocarbon group.

3. The composition of claim 2, wherein said R contains at least one functional group selected from the group consisting of uretdiones, allophanates and biurets.

4. The composition of claim 1 wherein said R is a $C_4$–$C_{25}$ organic radical.

5. The composition of claim 1 wherein said R is selected from the group consisting of a cycloaliphatic hydrocarbon radical having 5 to 15 carbon atoms, an araliphatic hydrocarbon radical having 7 to 15 carbon atoms and an aromatic hydrocarbon group having 6 to 15 carbon atoms.

6. The composition of claim 1 wherein said isocyanatereactive compound is a polyol.

7. The composition of claim 1 wherein said isocyanatereactive compound is an amine.

8. A coating comprising the composition of claim 1.

9. A potting compound comprising the composition of claim 1.

* * * * *